(12) United States Patent
Kitamura

(10) Patent No.: US 8,237,932 B2
(45) Date of Patent: *Aug. 7, 2012

(54) FIBER OPTIC GYROSCOPE WITH AUXILIARY FUNCTION

(75) Inventor: Atsushi Kitamura, Nagano (JP)

(73) Assignee: Minebea Co., Ltd., Nagano (JP)

( * ) Notice: Subject to any disclaimer, the term of this patent is extended or adjusted under 35 U.S.C. 154(b) by 530 days.

This patent is subject to a terminal disclaimer.

(21) Appl. No.: 12/462,032

(22) Filed: Jul. 28, 2009

(65) Prior Publication Data

US 2010/0053631 A1 Mar. 4, 2010

(30) Foreign Application Priority Data

Aug. 26, 2008 (JP) ................................. 2008-216677

(51) Int. Cl.
*G01C 19/72* (2006.01)
(52) U.S. Cl. ...................................................... 356/461
(58) Field of Classification Search .......... 356/459–462, 356/465, 483; 73/504.01
See application file for complete search history.

(56) References Cited

U.S. PATENT DOCUMENTS

| | | | |
|---|---|---|---|
| 4,120,587 A * | 10/1978 | Vali et al. ...................... | 356/461 |
| 5,636,021 A * | 6/1997 | Udd .............................. | 356/483 |
| 6,259,089 B1 * | 7/2001 | Vali et al. ..................... | 250/231.12 |
| 6,426,795 B1 * | 7/2002 | Wolter et al. .................. | 356/461 |
| 6,559,949 B1 * | 5/2003 | Numai ........................... | 356/459 |
| 2010/0046000 A1 * | 2/2010 | Kitamura et al. ............. | 356/461 |

FOREIGN PATENT DOCUMENTS

| | | |
|---|---|---|
| JP | 06-074775 | 3/1994 |
| JP | 2007-071614 | 3/2007 |

* cited by examiner

*Primary Examiner* — Michael A Lyons
(74) *Attorney, Agent, or Firm* — Carrier Blackman & Associates, P.C.; Joseph P. Carrier; William D. Blackman

(57) ABSTRACT

A fiber optic gyroscope includes first and second gyroscopes. The first gyroscope includes: a first light source for emitting two lights; a first optical fiber loop which includes a sensor coil structured such that an optical fiber is wound in a multi-layer manner, through which the two lights travel in opposite directions, and which constitutes a laser resonant circuit with the first light source; and a first optical detector for detecting an angular velocity based on a beat frequency which is produced by the two lights. The second gyroscope includes: a second light source for emitting light; an optical distributor for dividing the light into two lights; a second optical fiber loop through which the two lights travel in opposite directions and enter both respective ends of the sensor coil; and a second optical detector for detecting an angular velocity based on a phase difference between the two lights.

7 Claims, 3 Drawing Sheets

FIBER OPTIC GYROSCOPE WITH AUXILIARY FUNCTION

FIELD OF THE INVENTION

The present invention relates to a fiber optic gyroscope in which two lights emitted from both end surfaces of a laser diode travel through an optical fiber loop in the opposite directions, respectively, and which thereby detects an angular velocity of an object, more specifically, to a fiber optic gyroscope provided with an auxiliary optic gyroscope.

BACKGROUND OF THE INVENTION

A fiber optic gyroscope as adapted to measure a rotational angular velocity (angular velocity) of an object by using the Sagnac effect is widely used, particularly among the aircraft and rocket industries. The conventional fiber optic gyroscope is generally called an interference type fiber optic gyroscope which includes a light source to emit a light from one end surface, an optical fiber coupler to divide the light from the light source into two lights, and an optical fiber loop to allow the two divided lights to circulate therethrough in the respective opposite directions, wherein an angular velocity is measured based on variation of a phase (phase difference) attributed to the Sagnac effect between the two lights circulating in the optical fiber loop in the respective opposite directions (for example, Japanese Patent Application Laid-Open No. H6-74775).

Meanwhile, recently, an optical gyroscope (hereinafter described as a diode ring laser gyroscope as appropriate) is proposed in which a laser diode for emitting lights from both end surfaces thereof is disposed in an optical fiber loop, whereby the laser diode and the optical fiber loop in combination form a laser resonant circuit (laser resonator) (for example, Japanese Patent Application Laid-Open No. 2007-71614).

FIG. 3 schematically shows the composition of an optical gyroscope 50 as the diode ring laser gyroscope disclosed in Japanese Patent Application Laid-Open No. 2007-71614. The optical gyroscope 50 includes a semiconductor optical amplifier (SOA) 51 and an optical fiber 52 which is looped and which has its both ends connected to end surfaces 51A and 51B of the semiconductor optical amplifier 51, respectively. The semiconductor optical amplifier 51 emits laser beams CW and CCW respectively from the both end surfaces 51A and 51B, also amplifies by stimulated emission the laser beams CW and CCW which have circulated through the optical fiber 52 in the respective opposite directions, and then emits the amplified laser beams CW and CCW into the optical fiber 52 again.

Parts of the laser beams CW and CCW propagating in the optical fiber 52 in the counter directions are introduced into an optical fiber 54 via an optical coupler 53, and then, overlapped on each other at an optical coupler 55. The laser beams CW and CCW overlapped on each other are introduced into an optical detector 57 via an optical fiber 56. The optical detector 57 performs square law detection of the overlapped laser beams CW and CCW, and thereby detects a beat signal attributed to a difference in oscillation frequency between the laser beams CW and CCW. The difference in the oscillation frequency between the laser beams CW and CCW is caused because the optical fiber 52 and the semiconductor optical amplifier 51 constitute the laser resonator together. That is, the laser resonator lengths of the laser beams CW and CCW experience an effective change due to the Sagnac effect which is attributed to the rotation of the table 60.

The beat signal detected by the optical detector 57 is input to a spectrum analyzer 58, whereby a beat frequency $f_B$ is detected. An angular velocity of the rotating object (optical fiber) is calculated by a detector 59 based on the following formula showing the relation between the beat frequency $f_B$ detected and an angular velocity $\Omega$: $f_B=(4A/n\lambda P)\Omega$ where A represents an area of a region enclosed by the optical fiber 52, n represents a refractive index of the optical fiber 52, $\lambda$ represents wavelengths of the laser beams CW and CCW, P represents a path length of the laser beams CW and CCW, and $\Omega$ represents an angular velocity.

Because the diode ring laser gyroscope described above detects the angular velocity of the object by a beat frequency, the diode ring laser gyroscope is essentially enabled to measure the angular velocity with high detection sensitivity. However, when the inventor of the present invention considered to reduce the size of an optical fiber loop for the purpose of downsizing the diode laser gyroscope, it turned out that it is hard or impossible to detect the angular velocity when the optical fiber loop has a diameter of, for example, about 100 mm (so-called palm-size).

Also, the diode ring laser gyroscope can possibly fail to detect an angular velocity precisely if a light amount from the light source decreases due to, for example, the product life cycle. In order to cope with this problem, another fiber optic gyroscope structured identically may be provided for backup purpose, but the cost and volume of the detection apparatus are increased almost double.

Moreover, if the angular velocity is small, the diode ring laser gyroscope fails to successfully detect the angular velocity due to so-called lock-in phenomenon. It is well known that in order to be free from the lock-in phenomenon, a mechanical dither system is provided for the diode ring laser gyroscope thereby mechanically vibrating the optical fiber loop. However, to mechanically vibrate the optical fiber can possibly result in increasing a noise component of a detection signal. Also, the provision of the mechanical dither system requires an additional space.

SUMMARY OF THE INVENTION

The present invention has been made in the light of the problems described above, and it is an object of the present invention to provide a diode ring laser gyroscope which is provided with an auxiliary optical gyroscope but still remains relatively small in cost and volume and which can measure an angular velocity with excellent detection sensitivity despite its small size.

In order to achieve the object described above, according to an aspect of the present invention, there is provided a fiber optic gyroscope which includes a first gyroscope for detecting an angular velocity of a rotating object and a second gyroscope for subsidiarily detecting the angular velocity of a rotating object. The first gyroscope includes: a first light source for emitting two lights from both end surfaces thereof; a first optical fiber loop which includes a sensor coil structured such that an optical fiber is wound in a multilayer manner, and through which the two lights emitted from the both end surfaces of the first light source travel in respective opposite directions, the first optical fiber loop constituting a laser resonant circuit together with the first light source; and a first optical detector for detecting an angular velocity based on a beat frequency which is produced by the two lights traveling through the first optical fiber loop in the opposite directions. On the other hand, the second gyroscope includes: a second light source for emitting light from one end surface thereof; an optical distributor for dividing the light emitted from the one end surface of the second light source into two lights; a second optical fiber loop through which the two lights from the optical distributor travel in respective opposite directions so as to pass respectively via first and second optical couplers and enter both respective ends of the sensor coil constituting the first optical fiber loop; and a second optical detector for detecting an angular velocity based on a phase difference between the two lights traveling through the second optical fiber loop in the respective opposite directions.

In the aspect of the present invention, the fiber optic gyroscope may further include a control circuit for controlling operation of the first light source and the second light source, wherein when the control circuit detects that the first gyroscope fails to properly function, the first gyroscope is caused to stop its operation and the second gyroscope is caused to start its operation. In this connection, the control circuit may detect, based on a decrease in light intensity of the first light source or on lock-in phenomenon, that the first gyroscope fails to properly function.

In the aspect of the present invention, the second light source may be a super luminescent diode.

In the aspect of the present invention, the first light source and the second light source may emit respective lights different from each other in wavelength, and the first and second optical couplers to constitute the second gyroscope may be a wavelength multiplexer-demultiplexer in which two lights input respectively from two input ports are output from one output port.

In the aspect of the present invention, the fiber optic gyroscope may be constituted to satisfy a formula (1):

$$2\Delta F_{beat\_max} < F_{rig} \leq 10\Delta F_{beat\_min} \quad (1)$$

in which $F_{rig} = C/nL$, where $F_{rig}$ represents a ring resonant frequency, $\Delta F_{beat\_min}$ represents a beat frequency corresponding to a lower limit of an angular velocity measuring range, $\Delta F_{beat\_max}$ represents a beat frequency corresponding to an upper limit of the angular velocity measuring range, C represents a light speed, n represents a refractive index of the optical fiber, and L represents an overall length of a portion of the optical fiber, the portion constituting the first optical fiber loop.

DETAILED DESCRIPTION OF THE INVENTION

Figure 1:
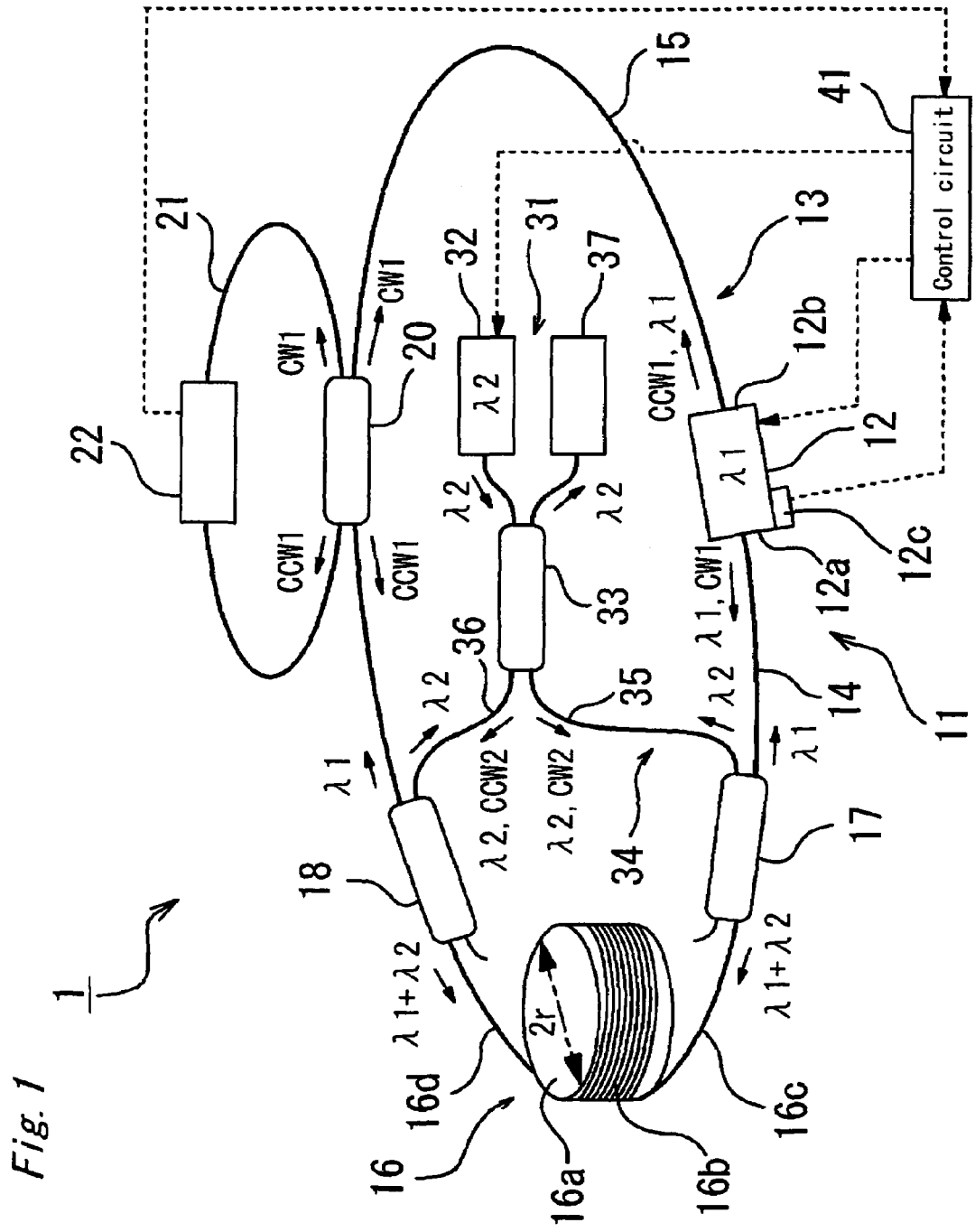
FIG. 1 is a schematic view of an entire composition of a fiber optic gyroscope according to an embodiment of the present invention.

An exemplary embodiment of the present invention will be described hereinafter referring to the accompanying drawings. FIG. 1 schematically shows an entire component of a fiber optic gyroscope 1 according to an embodiment of the present invention. The fiber optic gyroscope 1 includes a first gyroscope 11 which constitutes a main detection system of an angular velocity, a second gyroscope 31 which constitutes an auxiliary detection system thereof, and a control circuit 41 for controlling the operation of light sources. In FIG. 1, dashed lines show electric signal lines.

The first gyroscope 11 is a diode ring laser gyroscope which includes a diode laser 12 as a first light source adapted to emit lights from its both end surfaces, a first optical fiber loop 13 through which the lights emitted from the both end surfaces of the laser diode 12 travel in respective opposite directions, an optical splitter 20 for branching parts of lights CW1 and CCW1 which travel through the first optical fiber loop 13 clockwise and counter-clockwise, respectively (hereinafter referred to as CW1 light and CCW1 light), and a first optical detector 22 for detecting an angular velocity by the frequency of a beat signal (beat frequency) which is made by the CW1 and CCW1 lights branched at the optical splitter 20.

In the present embodiment, the laser diode 12 is a Fabry-Perot laser diode made of GaAs (gallium arsenide) system material which is adapted to emit a light with a wavelength of 850 nm (the wavelength is referenced as λ1), and its spectrum line width is about 10 MHz. An antireflective coating is applied to each of left and right end surfaces 12a and 12b of the laser diode 12, so the laser diode 12 emits lights from the both end surfaces 12a and 12b with less reflective lights thereat. The laser diode 12 is provided with a light intensity sensor 12c for monitoring the intensity of the emitted light.

In the present embodiment, the first optical fiber loop 13 is a single-mode optical fiber having a core diameter of 5 μm, a refractive index of 1.45 and a length of 340 m. The first optical fiber loop 13 includes a first coupler optical fiber 14 having its one end connected to the left end surface 12a of the laser diode 12, a second coupler optical fiber 15 having its one end connected to the right end surface 12b of the diode laser 12, a sensor coil 16 including an optical fiber wound in a multilayer manner, a first optical coupler 17 which connects between the other end of the first coupler optical fiber 14 and one end of the sensor coil 16, and a second optical coupler 18 which connects between the other end of the second coupler optical fiber 15 and the other end of the sensor coil 16.

The first and second coupler optical fibers 14 and 15 introduce the CW1 and CCW1 lights emitted from the both end surfaces 12a and 12b of the laser diode 12, respectively, into the first optical fiber loop 13 and also introduce the CCW1 and CW1 lights having traveled through the first optical fiber loop 13 in the respective opposite directions into the laser diode 12 via the both end surfaces 12a and 12b.

The sensor coil 16 includes a circular cylindrical bobbin 16a having a radius r, a coil winding 16b made of an optical fiber wound around the bobbin 16a in a multilayer manner, and both ends 16c and 16d of the optical fiber (both ends of the sensor coil 16). In the present embodiment, the radius r of the bobbin 16a is 30 mm.

In the present embodiment, the first and second optical couplers 17 and 18 are a so-called wavelength multiplexer-demultiplexer, specifically, a 2-in/1-out optical directional coupler in which two optical fibers are melted and stretched to be combined together. The other ends of the first coupler optical fiber 14 and the second coupler optical fiber 15 are connected to respective one input ports of the first optical coupler 17 and the second optical coupler 18, while the both ends 16c and 16d of the sensor coil 16 are connected to respective output ports of the first optical coupler 17 and the second optical coupler 18, whereby the CW1 and CCW1 lights traveling through the first and second coupler optical fibers 14 and 15 enter the both ends 16c and 16d of the sensor coil 16 via the first and second optical couplers 17 and 18, respectively. Then, the CCW1 and CW1 lights having circulated through the sensor coil 16 enter the coupler fibers 14 and 15 via the ends 16c and 16d of the sensor coil 16 and the first and second couplers 17 and 18, respectively. The first and second optical couplers 17 and 18 will be described hereinlater again.

In the present embodiment, the optical splitter 20 is a 2-in/2-out optical directional coupler structured such that two optical fibers are melted and stretched to be combined together. The optical splitter 20 is disposed in the optical path of the second coupler optical fiber 15 and adapted to extract and separate part (10% in the present embodiment) of each of the CW1 and CCW1 lights which travel through the first optical fiber loop 13. Ends of a looped detection optical fiber 21 which is connected to a first optical detector 22 are connected to the both ends (an input port and an output port) of the diverging side of the optical splitter 20 (that is at the outer side of the first optical fiber loop 13), whereby the two lights branched at the optical splitter 20 travel through the detection optical fiber 21 in the opposite directions, enter the first optical detector 22, and then are overlapped on each other thereat.

The first optical detector 22 includes a photodiode (light receiving element) for converting optical signals into electric signals, and a detection circuit to process output signals from the photodiode. The detection circuit detects a beat signal which is made by overlapping the CW1 and CCW1 lights on each other, and then calculates an angular velocity based on the frequency of the beat signal.

The second gyroscope 31 is a interference fiber optic gyroscope, and includes a super luminescent diode (SLD) 32 as a second light source to emit a light from its one end, an optical distributor 33 for equally distributing the light from the SLD 32 in two directions, a second optical fiber loop 34 through which the lights equally distributed by the optical distributor 33 travel in the respective opposite directions, and a second optical detector 37 for detecting an angular velocity according to the phase difference between a light CW2 (hereinafter referred to as CW2 light) to travel clockwise through the second optical fiber loop 34 and a light CCW2 (hereinafter referred to as CCW2 light) to travel counterclockwise through the second optical fiber loop 34.

In the present embodiment, the SLD 32 is adapted to emit a light with a wavelength of 900 nm (the wavelength is referenced as $\lambda 2$).

In the present embodiment, the optical distributor 33 is a 2-in/2-out optical directional coupler structured such that two optical fibers are melted and stretched to be combined together. The SLD 32 is connected to one of two input ports of the optical distributor 33, and the second optical detector 37 is connected to the other input port of the optical distributor 33. Also, both ends of the second optical fiber loop 34 are connected to two output ports of the optical distributor 33.

The second optical fiber loop 34 includes first and second coupler optical fibers 35 and 36, the first and second optical couplers 17 and 18, and the sensor coil 16.

In the present embodiment, the first and second coupler optical fibers 35 and 36 are the same type of optical fiber as used for the first optical fiber loop 13 and connect respectively between one output port of the optical distributor 33 and the other input port of the first optical coupler 17 and between the other output port of the optical distributor 33 and the other input port of the second input port of the second optical coupler 18.

The first and second optical couplers 17 and 18 are a 2-in/1-out optical directional coupler (wavelength multiplexer-demultiplexer) as described above. Since the light emitted from the laser diode 12 as the first light source has the wavelength $\lambda 1$ different from the wavelength $\lambda 2$ of the light emitted from the SLD 32 as the second light source, the two lights are adapted to enter two respective input ports of each of the first and second optical couplers 17 and 18 and exit one same output port of each thereof. Specifically, the other ends of the first and second coupler optical fibers 14 and 15 of the first optical fiber loop 13 are connected to respective one input ports of the first and second optical couplers 17 and 18, while the other ends of the first and second coupler optical fibers 35 and 36 of the second optical fiber loop 34 are connected to respective other input ports of the first and second optical couplers 17 and 18, whereby two lights emitted from the laser diode 12 and the SLD 32 travel through the first/second optical coupler 17/18, enter the end 16c/16d of the sensor coil 16 connected to the output port of the first/second optical coupler 17/18 and are effectively introduced into the coil winding 16b with a smaller coupling loss (multiplexing).

Then, the two lights, which have circulated through the coil winding 16b, are branched at the second/first optical coupler 18/17 selectively according to the wavelength $\lambda 1$ or $\lambda 2$ (demultiplexing). One of the two lights, which has the wavelength $\lambda 2$ and which has been branched at the second/first optical coupler 18/17, is guided through the second/first coupler optical fiber 36/35 to the optical distributor 33 and then to the second optical detector 37. In this connection, the variation of the wavelength $\lambda 1$ of the light from the diode laser 12 due to the Sagnac effect is far smaller than the difference between the wavelength $\lambda 1$ and the wavelength $\lambda 2$, and therefore light loss is not caused at the first and second optical couplers 17 and 18.

The second optical detector 37 includes a photodiode (light receiving element) for converting optical signals into electrical signals and a detection circuit for processing the signals sent from the photodiode. The detection circuit detects phase difference according the intensity of coherent light caused by the CW2 and lights and calculates an angular velocity based on the phase difference detected.

Operation and effects of the fiber optic gyroscope 1 will be described hereinafter referring to FIG. 1.

When current from the control circuit 41 is supplied to the laser diode 12 as the first light source of the first gyroscope 11, the CW1 and CCW1 lights come out respectively from the both end surfaces 12a and 12b of the laser diode 12. The CW1 light having come out from the left end surface 12a of the laser diode 12 enters the end 16c of the sensor coil 16 via the first coupler optical fiber 14 and the first optical coupler 17, and then circulates through the coil winding 16b. The CW1 light having circulated through the coil winding 16b comes out from the end 16d of the sensor coil 16, propagates via the second optical coupler 18 and the second coupler optical fiber 15, and enters the laser diode 12 from the right end surface 12b. Thus, the CW1 light having come out from the left end surface 12a of the laser diode 12 travels clockwise through the optical circuit (laser resonator) which is constituted by the laser diode 12 and the first optical fiber loop 13, whereby laser oscillation is caused.

Meanwhile, the CCW1 light having come out from the right end surface 12b of the laser diode 12 enters the end 16d of the sensor coil 16 via the second coupler optical fiber 15 and the second optical coupler 18, and then circulates through the coil winding 16b. The CCW1 light having circulated through the coil winding 16b comes out from the end 16c of the sensor coil 16, propagates via the first optical coupler 17 and the first coupler optical fiber 14, and enters the laser diode 12 from the left end surface 12a. Thus, the CW1 light having come out from the right end surface 12b of the laser diode 12 travels counterclockwise through the optical circuit constituted by the laser diode 12 and the first optical fiber loop 13, whereby laser oscillation is caused.

Parts of the CW1 and CCW1 lights having traveled through the first optical fiber loop 13 enter the first optical detector 22 via the optical splitter 20 and the detection optical fiber 21. When the object at which the fiber optic gyroscope 1 is attached starts moving with rotation, a difference is produced in frequency (wavelength) between the CW1 light and the CCW1 light due to the Sagnac effect and a beat signal is made by overlapping the CW1 and CCW1 lights on each other. An angular velocity (is calculated according to a frequency (beat frequency) (Fbeat of the beat signal by using the formula (fB=(4A/nλP) (showing the relation between the beat frequency and the angular velocity) described earlier. In the present invention, an aggregate area A of the region enclosed by the optical fiber can be approximated by N(r2 which is a product of a cross section area $\pi r^2$ of the bobbin 16a of the sensor coil 16 having a radius r; and a turn number N of the optical fiber wound around the bobbin 16a in a multilayer manner. Also, an overall length L of the optical fiber as an optical path length (the length of the optical fiber of the first optical fiber loop 13) can be approximated by a length $2\pi rN$ which is the length of the optical fiber of the coil winding 16b of the sensor coil 16. Accordingly, the relation between the beat frequency $\Delta F_{beat}$ and the angular velocity $\Omega$ can be shown by a following formula:

$$\Omega=(n\lambda\tfrac{1}{2}r)\Delta F_{beat}$$

where n represents a refractive index of the optical fiber.

Judging by the above formula, in the first gyroscope 11 of diode ring laser type, the sensitivity of detecting an angular velocity, while depending on the radius r of the bobbin 16a of the sensor coil 16, does not depend on the overall length L of the optical fiber (or the turn number N of the optical fiber wound around the bobbin 16a in a multilayer manner). However, the inventor found out that by reducing the diameter of the bobbin 16a, a detecting device can be downsized but on the other hand totally fails to detect beat signals. Then, the inventor analyzed the cause thereof and considered the countermeasure, which shows that the beat signals can be effectively detected when the overall length L of the optical fiber is increased by winding the optical fiber around the bobbin 16a of the sensor coil 16 in a multilayer manner. This is attributed to the fact that since the line width of the ring resonant spectrum (longitudinal mode of a laser beam) is decreased with increase of the overall length L of the optical fiber, the beat signal, which is observed (produced) also as a sideband wave of the ring resonant spectrum, is not hidden in the ring resonant spectrum and thus can be duly detected.

Moreover, it turned out that it is preferable, for the purpose of detecting the beat signal with a good sensitivity, to keep the overall length L of the optical fiber within a certain range in view of the relation between the beat signal and the ring resonant spectrum. Specifically, it is preferable to set the overall length L of the optical fiber such that the beat frequency $\Delta F_{beat}$ and the ring resonant frequency (first-order ring resonant frequency) $F_{rig}$ satisfy the following relation: $2\Delta F_{beat\_max} < F_{rig} \leq 10\Delta F_{beat\_min}$ (more preferably, $2.5\Delta F_{beat\_max} \leq F_{rig} \leq 10\Delta F_{beat\_min}$) where $\Delta F_{beat\_min}$ represents a lower limit of the beat frequency $\Delta F_{beat}$ (the lower limit is a beat frequency corresponding to a lower limit $\Omega_{min}$ of an angular velocity measuring required for a gyroscope, and hereinafter referred to as beat frequency lower limit $\Delta F_{beat\_min}$), $\Delta F_{beat\_max}$ represents an upper limit of the beat frequency $\Delta F_{beat}$ (the upper limit is a beat frequency corresponding to an upper limit $\Omega_{max}$ of an angular velocity measuring range required for a gyroscope, and hereinafter referred to as beat frequency upper limit $\Delta F_{beat\_max}$). And, the ring resonant frequency $F_{rig}$ is expressed as $F_{rig}=C/nL$, where C represents a light speed. In this connection, the beat frequency lower limit $\Delta F_{beat\_min}$ is expressed as $\Delta F_{beat\_min}= 2r\cdot\Omega_{min}/n\lambda 1$, and the beat frequency upper limit $\Delta F_{beat\_max}$ is expressed as $\Delta F_{beat\_max}=2r\Omega_{max}/n\lambda 1$.

If the beat frequency lower limit $\Delta F_{beat\_min}$ and the ring resonant frequency $F_{rig}$ satisfy the relation $F_{rig} \leq 10\Delta F_{beat\_min}$, the spectrum line width of the ring resonant spectrum can be narrowed to such an extent that the beat frequency as the sideband wave of the ring resonant spectrum can be measured. Also, if the beat frequency upper limit $\Delta F_{beat\_max}$ and the ring resonant frequency $F_{rig}$ satisfy the relation $2\Delta F_{beat\_max} < F_{rig}$, the spectrum of the beat signal generated at the beat frequency is free from overlapping with the spectrum of the sideband wave generated at a lower frequency side of the ring resonant spectrum. Therefore, the first gyroscope 11 in which the overall length L of the optical fiber is set to satisfy the above conditions is allowed to detect an angular velocity all the way from the beat frequency lower limit $\Delta F_{beat\_min}$ to the beat frequency upper limit $\Delta F_{beat\_max}$ with good sensitivity.

Figure 2:
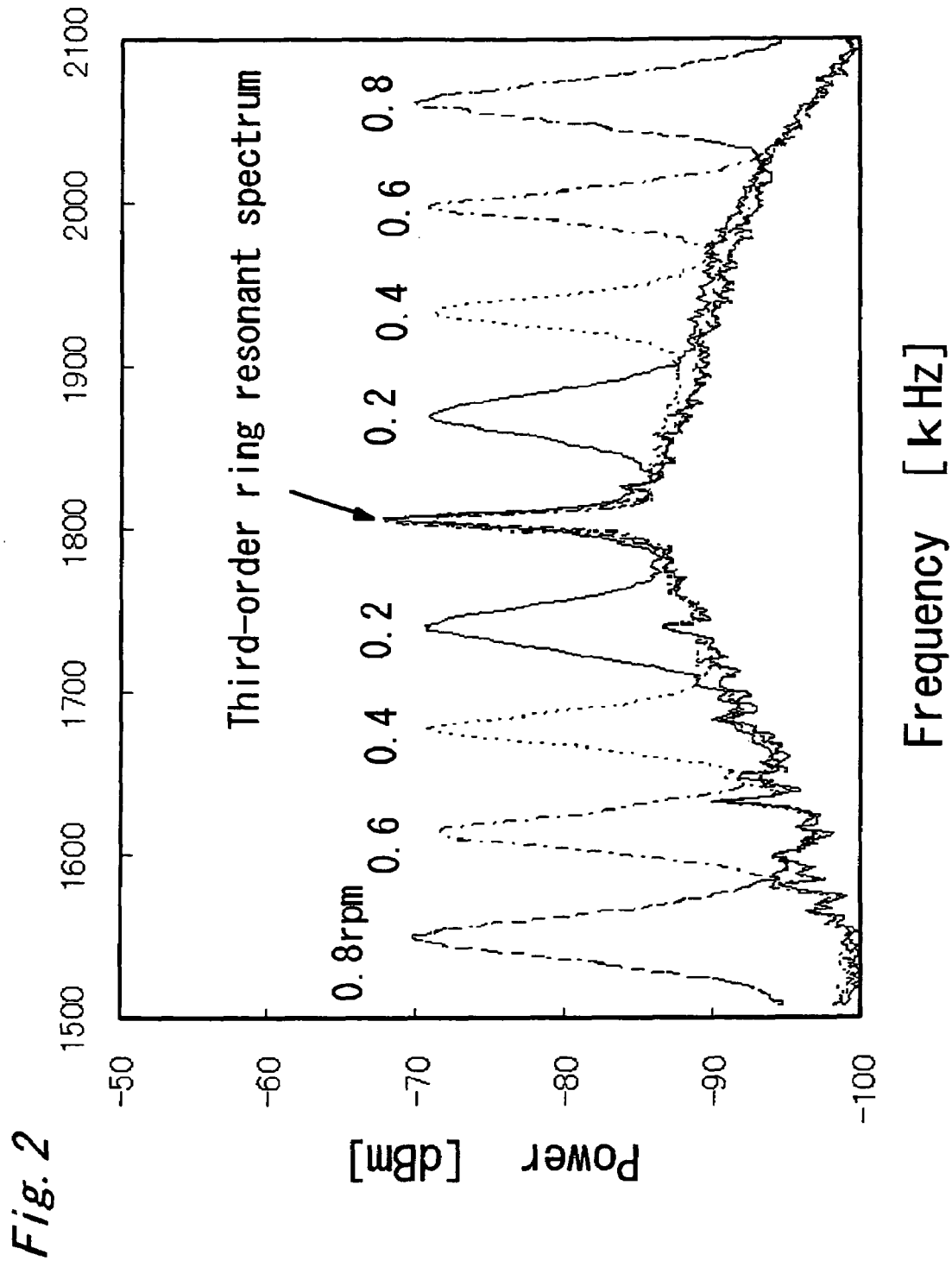
FIG. 2 is a graph of measurement results of a relation between an angular velocity (revolution number) of a first gyroscope and a frequency of a sideband wave of a ring resonant spectrum.
Figure 3:
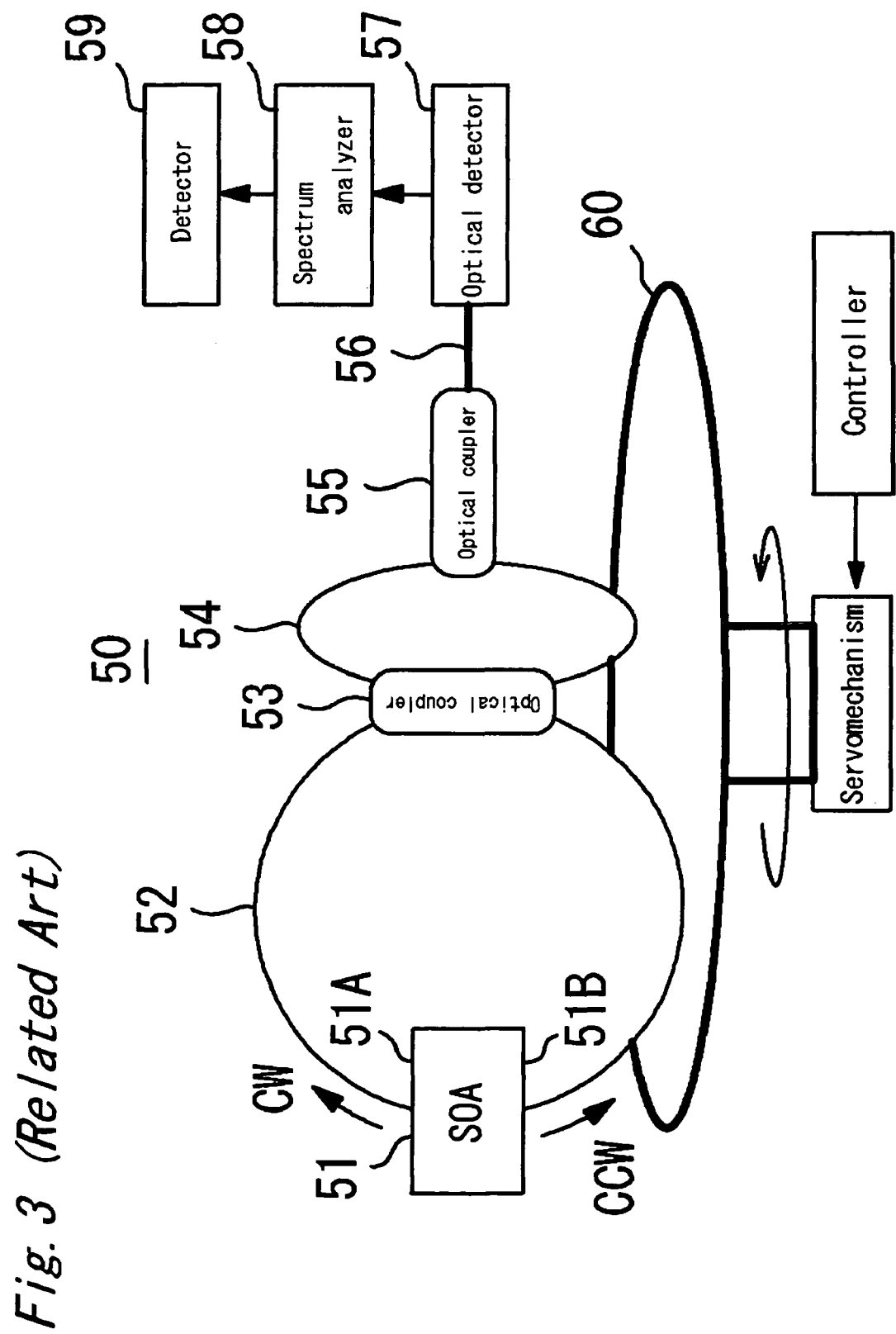
FIG. 3 is a schematic view of a composition of a conventional diode ring laser gyroscope.

To verify the above effect, the inventor evaluated the capability of the first gyroscope 11, and confirmed that the detection can be performed with good sensitivity for the beat frequency $\Delta F_{beat}$ (a frequency corresponding to the difference between the frequency of the third-order ring resonant spectrum and the frequency of the sideband wave) ranging from 60 kHz to 250 kHz (from 0.2 rpm to 0.8 rpm in terms of angular velocity) as shown in FIG. 2, wherein since the ring resonant frequency is about 600 kHz, the relation $2\Delta F_{beat\_max} < F_{rig} \leq 10\Delta F_{beat\_min}$ is satisfied.

When the control circuit 41 senses, based on the signal from the light intensity sensor 12c of the laser diode 12, that the light intensity of the laser diode 12 falls off below a predetermined value thus disabling the first gyroscope 11 to properly perform its function (specifically, an angular velocity cannot be detected at all or the detection sensitivity falls off), the control circuit 41 stops supplying current to the laser diode 12 and starts supplying current to the SLD 32 as the light source for the second gyroscope 31 thereby causing the SLD 32 to emit lights, and the second gyroscope 31 starts its operation. One light emitted from the one end surface of the SLD 32 is split equally into two lights by the optical distributor 33, and the two lights enter the first and second optical coupler fibers 35 and 36, respectively. The CW2 light having entered the first coupler optical fiber 35 enters the end 16c of the sensor coil 16 via the first optical coupler 17, and then circulates through the coil winding 16b. The CW2 light having circulated through the coil winding 16b exits from the end 16d of the sensor coil 16, travels through the second optical coupler 18, the second coupler optical fiber 36 and the optical distributor 33, and enters the second optical detector 37.

Meanwhile, the CCW2 light having entered the second coupler optical fiber 36 enters the end 16d of the sensor coil 16 via the second optical coupler 18, and then circulates through the coil winding 16b. The CCW2 light having circulated through the coil winding 16 exits from the end 16c of the sensor coil 16, travels through the first optical coupler 17, the first coupler optical fiber 35 and the optical distributor 33, and enters the second optical detector 37.

If the object on which the fiber optic gyroscope 1 is mounted starts making a rotation, a phase difference between the CW2 and CCW2 lights is made at the second gyroscope 31 due to the Sagnac effect. The second optical detector 37 detects the phase difference, and then an angular velocity $\Omega$ is calculated with the phase difference detected. In an interference type fiber optic gyroscope, the phase difference due to the Sagnac effect is proportional to the overall length of the optical fiber of the second optical fiber loop. Therefore, the second gyroscope 31, which is an interference type fiber optic gyroscope, also can be adapted to accurately detect an angular velocity when lights are arranged to circulate through the coil winding 16b.

As it can be understood from the operation described above, in the fiber optic gyroscope 1 according to the present invention, the second gyroscope 31 can be caused to operate if the first gyroscope 11 becomes deteriorated due to its lifetime or the like thus failing to properly perform its function, and therefore the detection of angular velocity can be duly performed continuously. Also, the first gyroscope 11 and the second gyroscope 31 share the one sensor coil 16, whereby an auxiliary fiber optic gyroscope can be provided in the fiber optic gyroscope 1 without increasing the cost and the volume too much.

The exemplary embodiment of the present invention has been illustrated as above, but the present invention is not limited to the specific embodiment described, and various modifications and combinations of the illustrative embodiment are possible.

For example, in the above description, when the first gyroscope 11 fails to properly detect the angular velocity due to the falloff of the light intensity of the laser diode 12, the second gyroscope 31 is adapted to operate expeditiously as an auxiliary function. However, the present invention is not limited in operation to the embodiment described above, and alternatively the second gyroscope 31, which is an interference optic fiber gyroscope and does not suffer from the lock-in phenomenon at a low angular velocity range, may be adapted to operate supplementarily if it is determined by a detection signal at the first optical detector 22 that the first gyroscope 11 is used under circumstance of such a low angular velocity range as to lead to the lock-in phenomenon (another faulty operation mode), whereby a low angular velocity can be detected without providing a mechanical dither system. Also, the second gyroscope 31 may be adapted to operate if an angular velocity below the lower limit $\Omega_{min}$ of the angular velocity measuring range or above the upper limit $\Omega_{max}$ thereof must be detected. Moreover, both the first and second gyroscopes 11 and 31 may be adapted to always operate without switching therebetween.

Also, in the above embodiment, the laser diode 12 and the SLD 32 respectively emit lights with different wavelengths, and the 2-in/1-out optical directional couplers (wavelength multiplexer-demultiplexer) are used as the first and second optical couplers 17 and 18, but the present invention is not limited to such an arrangement. If it is not needed to consider the light loss, the laser diode 12 and the SLD 32 may be adapted to emit lights with the same wavelength, and at the same time 2-in/2-out optical directional couplers may be provided as the first and second optical couplers 17 and 18 in place of the 2-in/1-out optical directional couplers (wavelength multiplexer-demultiplexer).

Further, the SLD 32 is used as the second light source of the second gyroscope 31 in the embodiment described above, but the present invention is not limited to the above structure, and for example, a laser diode may alternatively be used.

Furthermore, a single-mode fiber is used to constitute the first optical fiber loop 13 in the embodiment described above, but the present invention is not limited to the above structure, and a multi-mode optical fiber may be used in place of the single-mode optical fiber. Moreover, the bobbin 16a of the sensor coil 16 does not have to have a circular cylinder shape, and may alternatively have, for example, an oval or polygonal cylinder shape. And, the sensor coil 16 may be made such that an optical fiber is wound in a multilayer manner around an air core rather than the bobbin 6a.

What is claimed is:

1. A fiber optic gyroscope comprising:
    a first gyroscope for detecting an angular velocity of a rotating object, the gyroscope comprising
        a first light source for emitting two lights from both end surfaces thereof,
        a first optical fiber loop which comprises a sensor coil structured such that an optical fiber is wound in a multilayer manner, and through which the two lights emitted from the both end surfaces of the first light source travel in respective opposite directions, the first optical fiber loop constituting a laser resonant circuit with the first light source, and
        a first optical detector for detecting an angular velocity based on a beat frequency which is produced by the two lights traveling through the first optical fiber loop in the opposite directions; and
    a second gyroscope for subsidiarily detecting the angular velocity of a rotating object, the second gyroscope comprising
        a second light source for emitting light from one end surface thereof,
        an optical distributor for dividing the light emitted from the one end surface of the second light source into two lights,
        a second optical fiber loop which also includes the sensor coil and through which the two lights from the optical distributor travel in respective opposite directions so as to pass respectively via first and second optical couplers and enter both respective ends of the sensor coil, and
        a second optical detector for detecting an angular velocity based on a phase difference between the two lights traveling through the second optical fiber loop in the respective opposite directions.

2. A fiber optic gyroscope according to claim 1, further comprising a control circuit for controlling operation of the first light source and the second light source, wherein when the control circuit detects that the first gyroscope fails to properly function, the first gyroscope is caused to stop its operation and the second gyroscope is caused to start its operation.

3. A fiber optic gyroscope according to claim 2, wherein the control circuit detects, based on a decrease in light intensity of the first light source, that the first gyroscope fails to properly function.

4. A fiber optic gyroscope according to claim 2, wherein the control circuit detects, based on lock-in phenomenon, that the first gyroscope fails to properly function.

5. A fiber optic gyroscope according to claim 1, wherein the first light source and the second light source emit respective lights different from each other in wavelength, and the first and second optical couplers of the second gyroscope are a wavelength multiplexer-demultiplexer in which two lights input respectively from two input ports are output from one output port.

6. A fiber optic gyroscope according to claim 1, wherein the second light source is a super luminescent diode.

7. A fiber optic gyroscope according to claim 1, wherein the first optical fiber loop is constituted to satisfy a formula (1):

$$2\Delta F_{beat\_max} < F_{rig} \leq 10\Delta F_{beat\_min} \tag{1}$$

in which $F_{rig} = C/nL$, where $F_{rig}$ represents a ring resonant frequency, $\Delta F_{beat\_min}$ represents a beat frequency corresponding to a lower limit of an angular velocity measuring range, $\Delta F_{beat_{13}\ max}$ represents a beat frequency corresponding to an upper limit of the angular velocity measuring range, C represents a light speed, n represents a refractive index of theoptical fiber, and L represents an overall length of a portion of the optical fiber, the portion constituting the first optical fiber loop.

* * * * *